3,491,027
COMPOSITION AND METHOD FOR CLEANING SALT RESIDUES FROM METAL SURFACES

Hayward R. Baker, Silver Spring, Md., and Paul B. Leach, Woodlawn Manor, Va., assignors to the United States of America as represented by the Secretary of the Navy
No Drawing. Filed Feb. 28, 1966, Ser. No. 532,532
Int. Cl. C02b 5/02; C23g 1/00
U.S. Cl. 252—86   5 Claims

ABSTRACT OF THE DISCLOSURE

Aqueous compositions which contain, by weight, 2.25 to 2.75% of tetrasodium ethylenediamine tetraacetate dihydrate, 9 to 11% of sodium nitrite, 9 to 11% of a water soluble nonionic surfactant, for example, a polyoxyethylene-polyoxypropylene alcohol, 4.5 to 5.5% of sodium benzoate, 33 to 39% of water, 14 to 18% of isopropanol and 14 to 23% of methanol. The compositions when diluted with water provide washing solutions which are effective to quickly flush salt water spray residues from compressor surfaces in gas turbine engines.

---

The invention described herein may be manufactured and used by or for the Government of the United States of America for governmental purposes without the payment of any royalties thereon or therefor.

This invention relates to a composition and method for washing of sea water salt deposits from metal surfaces.

Significant amounts of sea water spray are ingested by the compressor of gas turbine engine powered aircraft operating near the surface of the ocean, as in the case of helicopters hovering in rescue operations at sea and in the take-off and landing of carrier-based aircraft. High velocity air entering the compressor evaporates the water of the ingested spray to leave a dense deposit of salt on the compressor. Accumulation of salt on the compressor can be heavy enough, at times, to degrade the aerodynamic characteristics of the compressor with resulting loss in power. Accumulated salt on the compressor can also lead to rust corrosion of 403 and 410 stainless steel compressor blades, especially where they fit into the high strength aluminum alloy slip rings.

To minimize adverse results from sea water salt deposits on the compressor surfaces in gas turbine engines in aircraft, it has been prior practice to periodically flush the compressor with water. Following the water flushing, a preservative composition is sprayed into the compressor section to retard rusting in the idle engine. A disadvantage of flushing with water is a delayed removal of the salt residues due to the relatively slow penetration of the salt deposits by water.

It is the general object of the present invention to accelerate the removal of salt water residues from the compressor of gas turbine engines in aircraft. It is also an object to provide compositions which may be added to water to form washing solutions which are effective to quickly remove salt water residues from metal surfaces.

The above and other objects are achieved by the compositions of the invention and their use with water for the flushing of salt water residues from metal surfaces, more particularly from compressors of gas turbine engines in aircraft.

The new compositions are solutions which contain, by weight, from about 2.25 to 2.75% of tetrasodium ethylenediamine tetraacetate dihydrate, about 9 to 11% of sodium nitrite, about 33 to 39% of water, about 9 to 11% of a nonionic surfactant, about 4.5 to 5.5% of sodium benzoate, about 14 to 18% of isopropanol and about 14 to 23% of methanol.

Preparation of the new compositions may be accomplished by dissolving the tetrasodium ethylenediamine tetraacetate dihydrate and sodium nitrite in the water and the nonionic surface active agent in the isopropanol and methanol which have been previously mixed. These two clear solutions are then mixed and the sodium benzoate added thereto to form the final clear solution which is the composition.

The new compositions when combined with water in the proportions, by volume, of 1 part to from about 60 to 140 parts of water form aqueous solutions which are effective to quickly flush salt water spray residues from compressor surfaces in gas turbine engines. The period of time required for removal of salt water residues from metal surfaces with the aqueous solutions of the compositions is substantially shorter than that required under like circumstances with water as the flushing liquid. The aqueous solutions of the compositions will penetrate a dense layer of salt on a metal surface in less than a minute, whereas water will stand on the dense salt layer for periods of 5 to 10 minutes before penetrating it. When the ambient air temperature at the place of use is below 40° F., it is recommended that the washing solution be prepared by adding the composition to a solution of 60% water and 40% methanol by weight in place of the water alone. In such instances, the methanol will serve as washing liquid in addition to being a freezing point depressant.

In the aqueous washing solutions prepared by the addition of the compositions to water or to the water-methanol solution, the tetrasodium ethylenediamine tetraacetate dihydrate serves as a water-softener, the sodium nitrite as a rust inhibitor for steel, the sodium benzoate to reduce discoloration of aluminum surfaces which may occur with sodium nitrite alone and to supplement the inhibitory action of the sodium nitrite, the nonionic surface active agent as a detergent, the isopropanol as a penetrant which reaches through the salt deposit to the metal surfaces and the methanol as a solubilizer for the composition in water.

Any of the water-soluble nonionic surfactants may be used as the detergent ingredient in the compositions. They are effective in both sea water and fresh water. A number of them are available commercially, for example, the water-soluble Pluronics which are polyoxyalkylene alcohols of the general formula:

$$HO(CH_2CH_2O)_m(CH_3CH_2CH_2O)_n(CH_2CH_2O)_mH$$

and contain from about 20 to 60 ethylene oxide groups and from about 80 to 40 propylene oxide groups and the water-soluble Tweens 20 and 40 which are, respectively, tris(polyoxyethylene) sorbitan monolaurate and tris(polyoxyethylene) sorbitan monopalmitate.

The invention is further illustrated by the following preferred composition:

| | Percent by weight |
|---|---|
| Tetrasodium ethylenediamine tetraacetate dihydrate | 2.5 |
| Sodium nitrite | 10.0 |
| Water | 35.5 |
| Pluronic L-43 [1] | 10.0 |
| Sodium benzoate | 5.0 |
| Isopropanol | 16.0 |
| Methanol | 21.0 |

[1] A water-soluble Pluronic which contains 30 ethylene oxide groups and 70 propylene oxide groups.

The effectiveness of the compositions of the invention to promote removal of sea water salt deposits from metal surfaces was demonstrated by the following test. An 18–8 stainless steel plate was wetted with synthetic sea water and allowed to dry by standing in the air at room temperature. This procedure was repeated until a salt layer of about 1/16 inch thickness was built up on the plate. The coated steel plate was then subjected to baking in an oven at 300° F. overnight. A washing solution was made up to contain 1 part by volume of the above preferred composition and 99 parts by volume of water. Several drops of this washing solution were placed on the baked salt layer on the steel plate arranged in the horizontal position. A like number of drops of water (tap) were placed on a different area of the salt layer on the plate. The washing solution loosened and dissolved most of the baked salt layer at the locus of its application in less than one minute. The water remained on the layer for a period of 5 minutes before it loosened and dissolved most of the salt layer at the locus of its application.

The effect of the sodium nitrite and sodium benzoate on the corrosion of metals when they are left as residues on washed metal surfaces was evaluated by the following test. A portion of the above washing solution containing the preferred composition in the proportion of 1 volume to 99 volumes of water was mixed with 10% of its volume of synthetic sea water. A packet of test specimens of aluminum, mild steel, 403 stainless steel and copper in metallic contact in that order was immersed in the liquid mixture of washing solution and synthetic sea water. No corrosion was evident on any of the specimens after one week.

Flushing of salt water spray residues from the compressors of gas turbine engines in aircraft may be effected by spraying the aqueous washing solution of the composition through the compressor section during coast-down of the engine to idle. In the case of the T–58 (G.E.) gas turbine engine, spraying of the flushing solution is effected through a spray ring fitted around the mouth of the compressor section. In the case of the J–79 (P.W.) gas turbine engine, the spray of flushing solution is delivered from an adaptor fitted in the back end of the scoop.

The compositions of the invention are also useful for making up washing solutions with water or with the water-methanol mixture for flushing salt residues from motor vehicles which have travelled over salted icy roads.

While the invention has been described herein with reference to a specific embodiment thereof, it is to be understood that such is to be taken by way of illustration and not in limitation except as may be defined in the appended claims.

What is claimed and desired to be secured by Letters Patent of the United States is:

1. An aqueous composition consisting essentially of a solution of, by weight, from about 2.25 to 2.75% of tetrasodium ethylenediamine tetraacetate dihydrate, from about 9 to 11% of sodium nitrite, from about 33 to 39% of water, from about 9 to 11% of a water-soluble nonionic surfactant, from about 4.5 to 5.5% of sodium benzoate, from about 14 to 18% of isopropanol and from about 14 to 23 percent of methanol.

2. An aqueous composition as defined in claim 1, wherein the water-soluble nonionic surfactant is a polyoxyethylene-polyoxypropylene alcohol of the general formula:

$$HO(CH_2CH_2O)_m(CH_3CH_2CH_2O)_n(CH_2CH_2O)_mH$$

wherein $m+m$ is an integer from about 20 to 60 and $n$ is an integer from about 80 to 40.

3. An aqueous composition as defined in claim 2, wherein the water-soluble polyoxyethylene-polyoxypropylene alcohol contains 30 ethylene oxide groups and 70 propylene oxide groups.

4. An aqueous composition which is a solution consisting essentially of, by weight, about 2.5% of tetrasodium ethylenediamine tetraacetate dihydrate, about 10% of sodium nitrite, about 35.5% of water, about 10% of a water-soluble nonionic surfactant which is a polyoxyethylene-polyoxypropylene alcohol of the general formula:

$$HO(CH_2CH_2O)_m(CH_3CH_2CH_2O)_n(CH_2CH_2O)_mH$$

wherein $m+m$ is the integer 30 and $n$ is the integer 70, about 5% of sodium benzoate, about 16% of isopropanol and about 21% of methanol.

5. A method of cleaning sea water spray residues from the compressor of a gas turbine engine in aircraft which comprises spraying into the compressor section of the engine, while the engine is operating under coast-down to idle, an aqueous washing solution consisting essentially of a composition of, by weight, from about 2.25 to 2.75% of tetrasodium ethylenediamine tetraacetate dihydrate, from about 9 to 11% of sodium nitrite, from about 33 to 39% of water, from about 9 to 11% of a water-soluble nonionic surfactant, from about 4.5 to 5.5% of sodium benzoate, from about 14 to 18% of isopropanol and from about 14 to 23% of methanol dissolved in a liquid selected from the group consisting of water and a water-methanol mixture of about 60% water and about 40% methanol by volume in the proportion of 1 volume of said composition to from about 60 to 140 volumes of said liquid.

References Cited

UNITED STATES PATENTS

| | | | |
|---|---|---|---|
| 2,399,134 | 4/1946 | Miller et al. | 134—3 |
| 2,802,788 | 8/1957 | Flaxman | 252—181 |
| 2,943,058 | 6/1960 | Cook | 252—153 |
| 3,110,684 | 11/1963 | Miller | 252—181 |
| 3,166,444 | 1/1965 | Ehren et al. | 134—3 |

OTHER REFERENCES

"Sequestrene," Alrose Chem. Co. (1952), pp. 1, 25, 26, 27, 35, 43.

LEON D. ROSDOL, Primary Examiner

W. SCHULZ, Assistant Examiner

U.S. Cl. X.R.

134—3; 252—181, 364